United States Patent
Adir et al.

(10) Patent No.: US 8,359,456 B2
(45) Date of Patent: Jan. 22, 2013

(54) GENERATING RANDOM ADDRESSES FOR VERIFICATION OF DISTRIBUTED COMPUTERIZED DEVICES

(75) Inventors: Allon Adir, Kiryat Tivon (IL); Gil Shurek, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 12/709,533

(22) Filed: Feb. 22, 2010

(65) Prior Publication Data

US 2011/0208945 A1 Aug. 25, 2011

(51) Int. Cl.
*G06F 12/00* (2006.01)
*G06F 9/26* (2006.01)
*G06F 9/34* (2006.01)
*G06F 11/00* (2006.01)
*G11C 29/00* (2006.01)
*G01R 31/28* (2006.01)

(52) U.S. Cl. ......... 711/217; 714/718; 714/728; 714/738
(58) Field of Classification Search ................ 711/217
See application file for complete search history.

(56) References Cited

U.S. PATENT DOCUMENTS

| | | | |
|---|---|---|---|
| 6,285,974 B1 | 9/2001 | Mandyam et al. | |
| 6,925,405 B2 * | 8/2005 | Adir et al. | 702/119 |
| 7,133,816 B2 * | 11/2006 | Adir et al. | 703/14 |
| 7,434,101 B2 * | 10/2008 | Adir et al. | 714/33 |
| 7,725,663 B2 * | 5/2010 | Bullman et al. | 711/152 |
| 2003/0130831 A1 | 7/2003 | Adir | |
| 2008/0270708 A1 * | 10/2008 | Warner et al. | 711/146 |
| 2009/0222694 A1 | 9/2009 | Adir et al. | |
| 2009/0280905 A1 * | 11/2009 | Weisman et al. | 463/40 |

\* cited by examiner

*Primary Examiner* — Yaima Campos
*Assistant Examiner* — Craig Goldschmidt
(74) *Attorney, Agent, or Firm* — Ziv Glazberg (57) ABSTRACT

Testing a circuit in a post-silicon stage is performed by enabling the different processing entities of the circuit to determine a consistent access permissions schema in a random manner. Based upon the consistent access permissions schema, addresses to be accessed during the testing of the circuit may be determined. The addresses may be determined in a random manner. The consistent permissions schema may be determined based on a template representative of repetitive portions of access permissions schema. The disclosed subject matter may utilize biasing modules to bias the test generation to provide a test having a predetermined characteristic. The disclosed subject matter may utilize a joint random seed or other techniques to provide for consistent random decisions by the different processing entities.

19 Claims, 4 Drawing Sheets

GENERATING RANDOM ADDRESSES FOR VERIFICATION OF DISTRIBUTED COMPUTERIZED DEVICES

BACKGROUND

The present disclosure relates to verification of computerized systems, in general, and to post-silicon testing of distributed computerized devices, in particular.

Computerized devices control almost every aspect of our life—from writing documents to controlling traffic lights. However, computerized devices are bug-prone, and thus require a testing phase in which the bugs should be discovered. The testing phase is considered one of the most difficult tasks in designing a computerized device. The cost of a bug may be enormous, as its consequences may be disastrous. For example, a bug may cause the injury of a person relying on the designated functionality of the computerized device. Additionally, a bug in hardware or firmware may be expensive to fix, as patching it requires call-back of the computerized device. Hence, many developers of computerized devices invest a significant portion, such as 70%, of the development cycle to discover erroneous functionalities of the computerized device.

The target computerized system may be a processor, a microprocessor, an electronic circuit, an integrated circuit, a chipset, a computerized device comprising a processor or the like. The target computerized system may comprise multiple processing entities, such as cores, threads or the like. The present disclosure refers to a processing entity of the target computerized system as a "processor".

Some of the testing of the target computerized system may be performed in a post-silicon stage. The post-silicon stage may refer to a stage after the target computerized system has been fabricated. In the present disclosure, fabricated target computerized system may be referred to as a circuit or as a silicon. For example, the post-silicon stage may be after the target computerized system is produced in accordance with a description provided by a descriptive language. It will be noted that the circuit may be different than a finalized product, such as for example comprising only a chip without a casing, being assembled manually, being only partially assembled and the like.

BRIEF SUMMARY OF THE INVENTION

One exemplary embodiment of the disclosed subject matter is a computerized system comprising: a memory device having a plurality of memory addresses; a random module configured to provide a random determination; a plurality of processors, wherein each processor of said plurality of processors comprising: an access permission determinator configured to determine an access permission associated with a memory address of the plurality of memory addresses, wherein said access permission is configured to utilize said random module; an address selector configured to select an address of the plurality of memory addresses based on a determination of said access permission determinator, wherein said address selector is configured to utilize said random module; and an accessing module configured to perform an access operation in the address selected by said address selector; wherein, each access permission determinator is configured to determine the same access permission associated with the memory address.

Another exemplary embodiment of the disclosed subject matter is a method for testing a computerized device, the computerized device comprising a plurality of processors, the computerized device comprising memory device having a plurality of memory addresses, the method comprising, at each of the plurality of processors: determining an access permission associated with a memory address of the plurality of memory addresses, wherein said determining an access permission is based upon a first random determination; selecting an address of the plurality of addresses based on the access permission, wherein said selecting the address is based upon a second random determination; performing an access operation in the address selected in said selecting the address; wherein the access permission determined by each of the plurality of processors is the same.

Yet another exemplary embodiment of the disclosed subject matter is a computer program product comprising: a computer readable medium; a set of program instructions operable in a computerized device comprising a plurality of processors, the computerized device comprising memory device having a plurality of memory addresses, said set of program instructions comprising: a first program instruction for determining an access permission associated with a memory address of the plurality of memory addresses, wherein the access permission is determined based upon a first random determination; a second program instruction for selecting an address of the plurality of addresses based on the access permission, wherein the address is selected based upon a second random determination; a third program instruction for performing an access operation in the address selected in said selecting the address; wherein said first, second and third program instructions are stored on said computer readable medium; and wherein said first program instruction is configured to provide for the same access permission for each processor of the plurality of processor.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to test the target computerized system in the post-silicon stage. Another technical problem is to test a circuit comprising a plurality of processor. The processors may access a shared resource, such as a memory device. During testing, collisions between processors may be discovered. Yet another technical problem dealt with by the disclosed subject matter is to enable each processor to define a test for itself. Various tests may be configured to access resources that are more likely to cause collisions. Yet another technical problem dealt with by the disclosed subject matter is to enable the creation of the test without requiring the processors to synchronize. Avoiding synchronization may increase efficiency of the test generation, and may reduce a timeframe for testing. Yet another technical problem is to determine the test in a random manner. Yet another technical problem is to validate the test results. Yet another technical problem is to bias the test generation to increase the probability of providing a test of relatively higher quality.

One technical solution is to load each processor with code for generation of a test. The processor may perform test generation based on the loaded code. Another technical solution is to define access permission schema for the shared resource. The shared access permission may be determined. Each processor may independently determine the shared access permission. The processors may utilize a random module providing random decisions. The random module may provide a consistent random set of decisions to each processor. The random module may utilize a joint random seed. The random module may alternatively store random results and dispatch the result to each processor. It will be noted that explicitly determining the access permission schema to the entire shared resource may be not practical or non-feasible, such as for example in case of a storage device having a large amount of storage capacity, such as for example one Terabyte. The disclosed subject matter may also solve this problem by determining the access permission schema based on a template access permissions. The template access permissions may be utilized to represent a repetitive portion of the shared resource. Yet another technical solution is to enable each processor to determine a portion of the shared resource to access, based on the template access permissions. Each processor may traverse the template and determine portions to access based on the shared access permission schema. Yet another technical solution is to provide a consistent traversal of the template to all processors, as to increase the probability that collisions may occur. Yet another technical solution is to traverse the template access permission in lieu of traversing the entire shared access permission schema.

One technical effect of utilizing the disclosed subject matter is automatically generate a test by each processor, without requiring synchronization. The test may be random or biased. The test may be generated without requiring synchronization between processors, hence providing a reduction in the time required to generate the test of the circuit. Another technical effect of utilizing the disclosed subject matter is to enable testing of a circuit that uses a memory device having a large amount of addresses. The disclosed subject matter enables for a reasonably efficient testing of any portion of the memory device, located in various regions of the memory device and the like.

Figure 1:
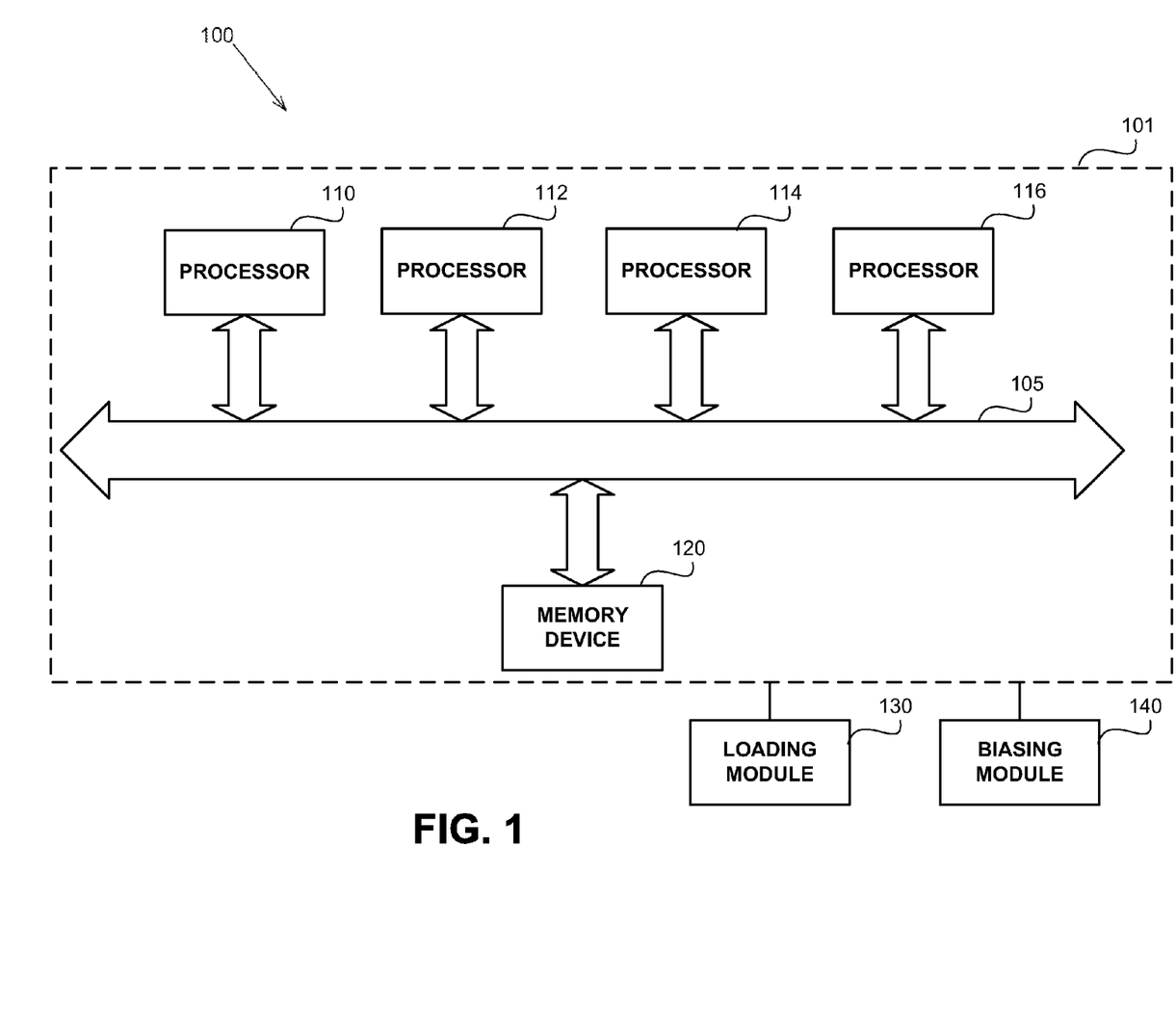
FIG. 1 shows a computerized environment in which the disclosed subject matter is used, in accordance with some exemplary embodiments of the subject matter.

Referring now to FIG. 1 showing a computerized environment in which the disclosed subject matter is used, in accordance with some exemplary embodiments of the subject matter. A computerized environment 100 comprises a circuit 101. The circuit 101 may comprise a plurality of processors 110, 112, 114 and 116. The circuit 101 may further comprise a shared resource, such as a memory device 120. Components of the circuit 101, such as the processor 110, may utilize a communication channel 105 to communicate with each other or to access the memory device 120. The communication channel 105 may be, for example, a bus.

In some exemplary embodiments, a loading module 130 may be configured to load program code, such as for example binary code or code written in assembly. The loading module 130 may load the program code such that a predetermined processor may perform the program code. The loading module 130 may, for example, load the program code to the memory device 120 and initiate operation of the circuit 101.

In some exemplary embodiments of the disclosed subject matter, the loading module 130 may load program code to each processor such that each processor may generate a test to be performed by the processor and/or perform the test. In some exemplary embodiments, the loading module 130 may be executed by an external device (not shown) or by the circuit 101. In some exemplary embodiments, the loading module 130 may load the same program code to each processor. The program code may provide different functionalities based on parameters of the processor, such as for example an identification of the processor. The code of each processor may be configured such that each processor may generate a test. The generated test may be stored in the memory device 120 in a dedicated location. The processor may initiate the test by for example performing an interrupt, performing a jump operation to the dedicated location, updating the program counter or the like.

In some exemplary embodiments, a biasing module 140 may be utilized by the circuit 101 in generation of a test. The biasing module 140 may be configured to provide a generation of testing that is biased to predetermined characteristics.

In some exemplary embodiments, the biasing module may comprise a checkable operation bias module (not shown) that may be configured to bias generation towards checkable operations. Checkable operations may be operations that their outcome may be validated. For example, an address within the memory device 120 to which only one processor may write, may be utilized in a checkable operation of writing by the processor. On the other hand if several processors may write to the address, the outcome of the test may change depending on order of operations, and therefore the writing operation may be considered not checkable.

In some exemplary embodiments, the biasing module may comprise a collision type bias module (not shown). The collision type bias module may be configured to bias toward a predetermined type of collision. A collision may occur when different processor access same or nearby addresses in the memory device 120. In some cases, the memory device 120 is logically divided into lines of memory, each comprising several of addresses. In such cases, accessing two addresses in the same line may cause a first type of collision. Accessing the same address may cause a different type of collision. The type of collision may also be affected by the type of access each processor performs. For example, a write/write collision, a read/read collision, a read/write collision and the like.

In some exemplary embodiments, the biasing module may comprise a memory topology aware bias module (not shown). The memory topology aware bias module may be configured to bias the generated test to exercising different portions of the memory device 120 based on the memory topology of the memory device 120. For example, in some cases, the memory device 120 may be distributed in different physical locations. The memory topology aware bias model may be configured to generate a test accessing different portion of the memory device 120 based on their respective locations and optionally based on the access procedure by the processor to the portion.

The computerized environment 100 may be configured to receive input from a user, such as a verification engineer. The input may be utilized, for example, by the biasing module 140, to perform a predetermined biasing operation, to provide a parameter to the biasing operation or the like.

Figure 2:
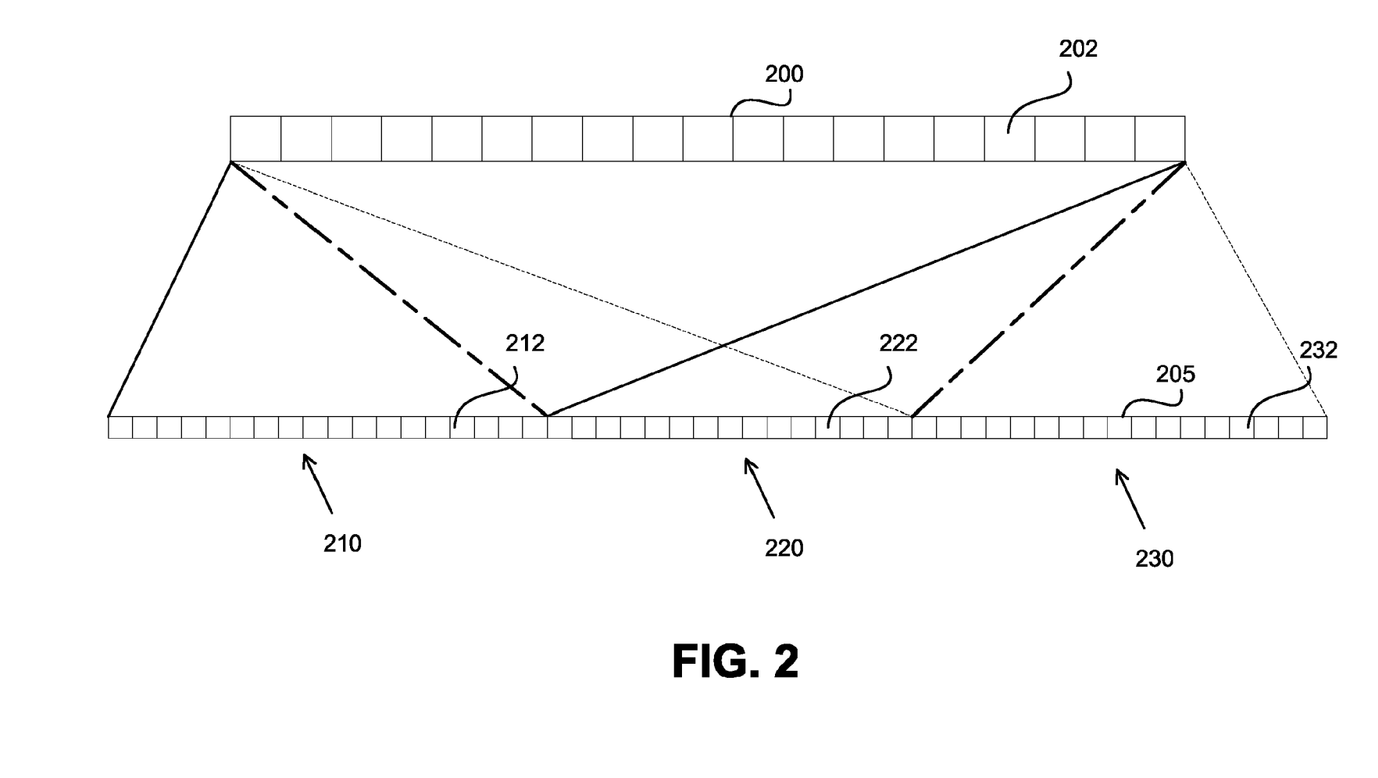
FIG. 2 shows a template access permission, in accordance with some exemplary embodiments of the disclosed subject matter.

Referring now to FIG. 2 a template access permission, in accordance with some exemplary embodiments of the disclosed subject matter. A memory device, such as 120 of FIG. 1, may be partitioned into blocks 205, such as block 212. In some exemplary embodiment, the block may be a single address. In other exemplary embodiments, the block may comprise a plurality of addresses. The block may be a basic unit that the memory device enables access to, such as a line as is disclosed above.

A template of access permissions 10 may be utilized to determine a shared access permission schema for the memory device. Access permissions may be determined for blocks of the template of access permissions 200, such as for example the block 202.

The permission may be, for example, read/write for all processors, read for all processors and write for all processors or the like. In some cases the permissions may be determined to each block, or to each address within the block. In some exemplary embodiments, a permission may comprise an owner process associated with the associated address. The permission may further comprise read or read and write permissions. The permission may represent that the owner may optionally also write. In case of no owner, all processes may write. The above is an exemplary permissions only. Other permissions may be utilized, as is known in the art.

The template of access permissions 200 may represent the shared access permission schema of the blocks 205. The template of access permissions 200 may be utilized in a repetitive manner to represent different portions of the blocks 205. For example, the portions 210, 220 and 230 may be associated with the same access permissions as defined by the template of access permissions 200. For example, the access permissions associated with the block 202 in the template of access permissions 200 may be associated with blocks 212, 222 and 232, within the different portion 210, 220 and 230 respectively.

In some exemplary embodiments, the shared access permission schema is determined based on the template of access permissions 200. The template of access permissions 200 may be determined by each processor, such as 110 of FIG. 1, on its own. The template of access permissions 200 may be determined by each processor to be the same template. The template of access permissions 200 may be determined in a random or biased manner.

Figure 3:
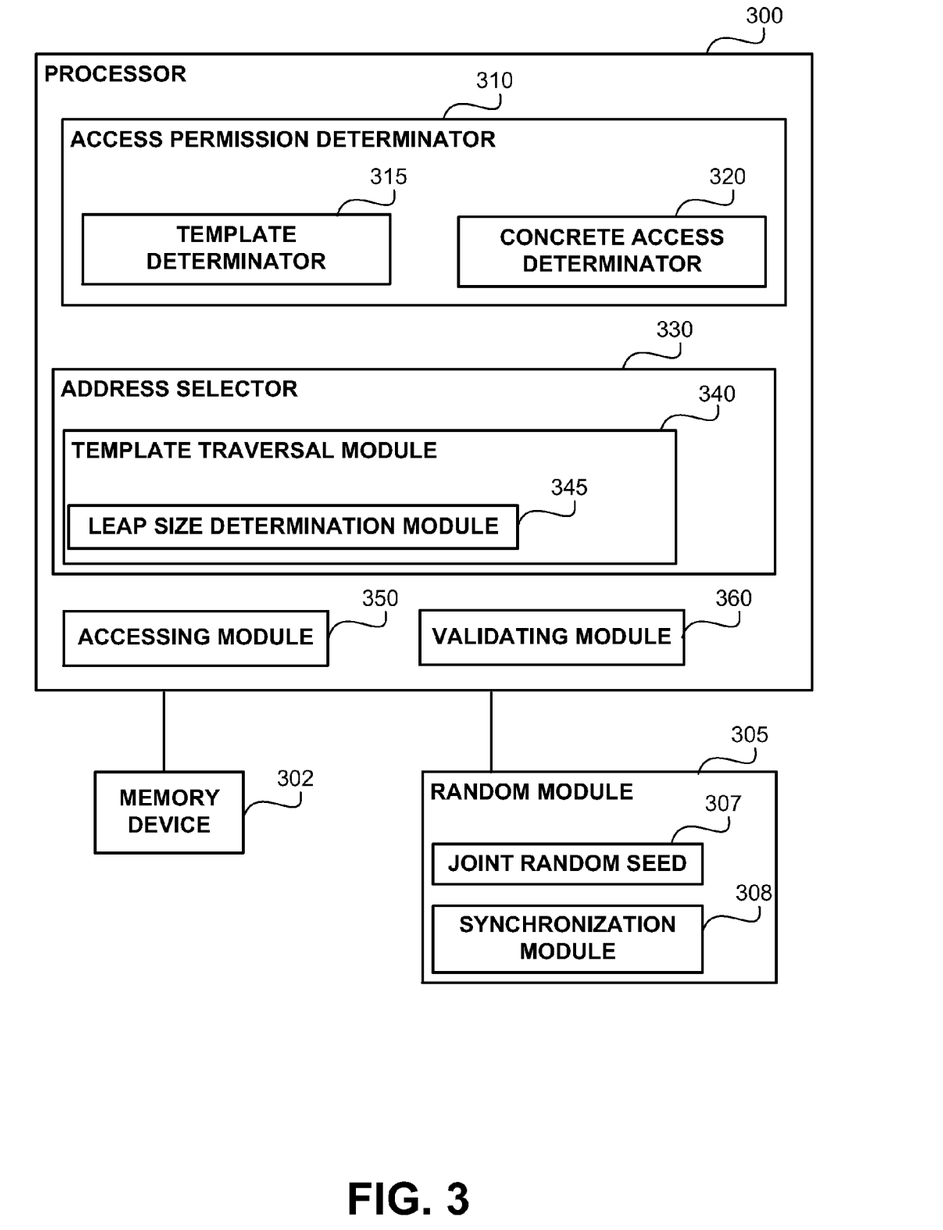
FIG. 3 shows a block diagram of a processor, in accordance with some exemplary embodiments of the disclosed subject matter.

Referring now to FIG. 3 showing a block diagram of a processor, in accordance with some exemplary embodiments of the disclosed subject matter. A processor 300, such as 110, 112, 114, 116 of FIG. 1, may comprise various components. It will be noted that the processor 300 may be configured to perform the functionality defined by the components. In some cases, a loading module, such as 130 of FIG. 1, may load program code that is configured to cause the processor 300 to perform the functionality of the components.

In some exemplary embodiments, an access permission determinator 310 may be configured to determine an access permission associated with an address of the memory device 302, such as 120 of FIG. 1. The access permission determinator 310 may utilize a random module 305 to randomly determine the access permissions. The access permission determinator 310 may be configured such that each processor may determine the same access permission to each address.

In some exemplary embodiments, the access permission determinator 310 may comprise a template determinator 315. The template determinator 315 may determine access permissions associated with a template, such as a template of access permissions 200 of FIG. 2. A size of the template may be predetermined or based on the number of blocks in the memory device 302. As the size of the template increases, generation time may increase. However, as the size of the template decreases, a quality of the tests may decrease. In an exemplary embodiment, a template of size 128 lines may be utilized. Each block may be divided into four blocks. Each block may be associated with a different permission. Therefore, cross-line collisions may be caused when accessing different blocks of the same line.

In some exemplary embodiments, a concrete access determinator 320 may determine an access permission of an address of the memory device 302 based on the access permission of the template.

In some exemplary embodiments, an address selector 330 may be configured to select an address associated with the memory device 302. The address may be utilized in a test of the processor 300. The address may be selected based on the permission of the access permission determinator 310. In some exemplary embodiments, each processor may select a plurality of addresses, such as for example sixteen addresses. A selected address may be stored, for example, in a variable, in a register such as a General Purpose Register (GPR) allocated for storing the selected address or the like.

In some exemplary embodiments, a template traversal module 340 may be utilized to select an address. The template traversal module 340 may traverse the template determined by the template determinator 315 and select an address for the processor 300 based on the access permissions associated with traversed portions of the template. In some exemplary embodiments, the address selector may select an address based on a block of the template. The selection may involve a random determination of the portion of the blocks, such as 205 of FIG. 2, to which the template block may be associated with for the selection. It will be noted, that in some exemplary embodiments, the aforementioned random determination may be a random determination of an offset of an address, a portion of an offset of an address, a portion of the address, such as a predetermined number of Most Significant Bits (MSBs) in the address and the like.

In some exemplary embodiments, a random traversal is determined based on random decision (or biased decisions) provided by the random module 305. The traversal may be traversal of blocks of the template in a predetermined or random order. Upon traversal of a block, an address of the block may be selected based on the permissions of the address. For example, an address owned by the processor 300 may be selected; an address writeable by the processor 300 may be selected; an address not owned by any processor may be selected; an address owned by another predetermined processor may be selected or the like. The selection may be performed based on characteristics associated with the processor 300. Therefore, even though the traversal of the template and the access permissions of the template may be exactly the same for each processor of the circuit 101 of FIG. 1, each may select different addresses. In some exemplary embodiments, the selection may depend on the processor 300 identification. In other exemplary embodiments, a processor 300 may perform a selection based on an identification of another processor determined automatically, randomly, manually or the like. Each processor may perform a selection based on different such "another" processor. In some exemplary embodiments, different processors may select similar address that may cause collisions. The similar addresses may be selected randomly be each processor, however, based on the disclosed subject matter, the addresses may inherently be similar addresses.

In some exemplary embodiments, the template traversal module 340 traverses the template by randomly selecting a starting block and by iteratively leaping a predetermined sized cyclic leap to another block. For example, in case a starting block is block 10, and there are a total of 16 blocks (IDed as 0 to 15), and the leap size is of 3 blocks, the template traversal module 340 may traverse blocks in the following order: 10, 13, 0, 3, 6, 9, 12, 15, 2, 5, 8, 11, 14, 1, 4, 7. The size of the leap may be determined by a leap size determination module 345. The leap size may be determined such that it is not a divider of the number of blocks, as to insure that all blocks may be traversed. In some exemplary embodiments, other methods may be utilized to determine an order of traversal of the blocks.

In some exemplary embodiments, an accessing module 350 may be configured to perform an access operation in the address selected by the address selector 330. The accessing module 350 may be a program code generated by the processor 300 or by another entity. The accessing module 350 may perform several access operations based on the selected addresses. In some exemplary embodiments, a synchronization between various processors may occur prior to initiating of the operation of the accessing module 350. The synchronization may insure that the various processors are all ready to initiate access operations and therefore may increase a probability of discovering a bug of the circuit.

In some exemplary embodiments, a validation module 360 may be utilized to validate an outcome of the operations performed by the accessing module 350. The validating module 360 may determine whether a current value in a portion of the memory device 302 is in accordance with a predetermined expected value. The validating module 360 may determine the expected value based on user input, previous performances by the accessing module 350, based on the operations performed by the accessing module 350 (e.g., last write operation by the processor 300 in an address that only the processor 300 is allowed to write in) or the like.

In some exemplary embodiments, a random module 305 may be configured to provide a random determination. The random module 305 may be configured to provide a consistent random decision to various processors. Random decisions may be consistent if the same random decision is provided to each processor. For example, in case a first processor receives three random decisions, a second processor should receive the exact same three random decisions. Different exemplary embodiments may provide for consistent random decisions. One exemplary embodiment utilizes a joint random seed 307. Another exemplary embodiment utilizes a synchronization module 308.

The joint random seed 307 may be a seed utilized by pseudo-random functions, as is known in the art. By using the same seed for all processors, it may be assured that all processors may be provided with consistent random decisions. In some exemplary embodiments, the random module 305 may be comprised by the processor 300 and may therefore not require any synchronized communication between the processor 300 and the random module 305.

The random module 305 may be a module external to the processor 300. Each processor may communicate with the random module 305 to receive the random decisions. The random module 305 may comprise a memory device (not shown) to retain previously determined random decisions. Upon receiving a request from a processor, the random module 305 may determine a serial number of the request from the processor (e.g., the fifth request). In case a random decision of the serial number (e.g., the fifth request) was already determined, the random module 305 may retrieve the determined value from the memory device. Otherwise, the random module 305 may determine the random decision based on any technique, such as using a pseudo-random function based on the time, and retain the determined value. In some cases, a synchronization module 308 may be required to enable communication between the processor 300 and the random module 305.

In some exemplary embodiments, the consistent random decisions by the random module 305 may be utilized in determining the access permissions of a template by the template determinator 315 to ensure that the access permissions are agreeable on all participants. The consistent random decisions may be utilized by the template traversal module 340 to insure consistent traversal of the template for all processors. The consistent random decisions may be utilized to insure consistent selection of an address based on the template, so that different processors may point to addresses within the same line, such that a collision may occur.

Figure 4:
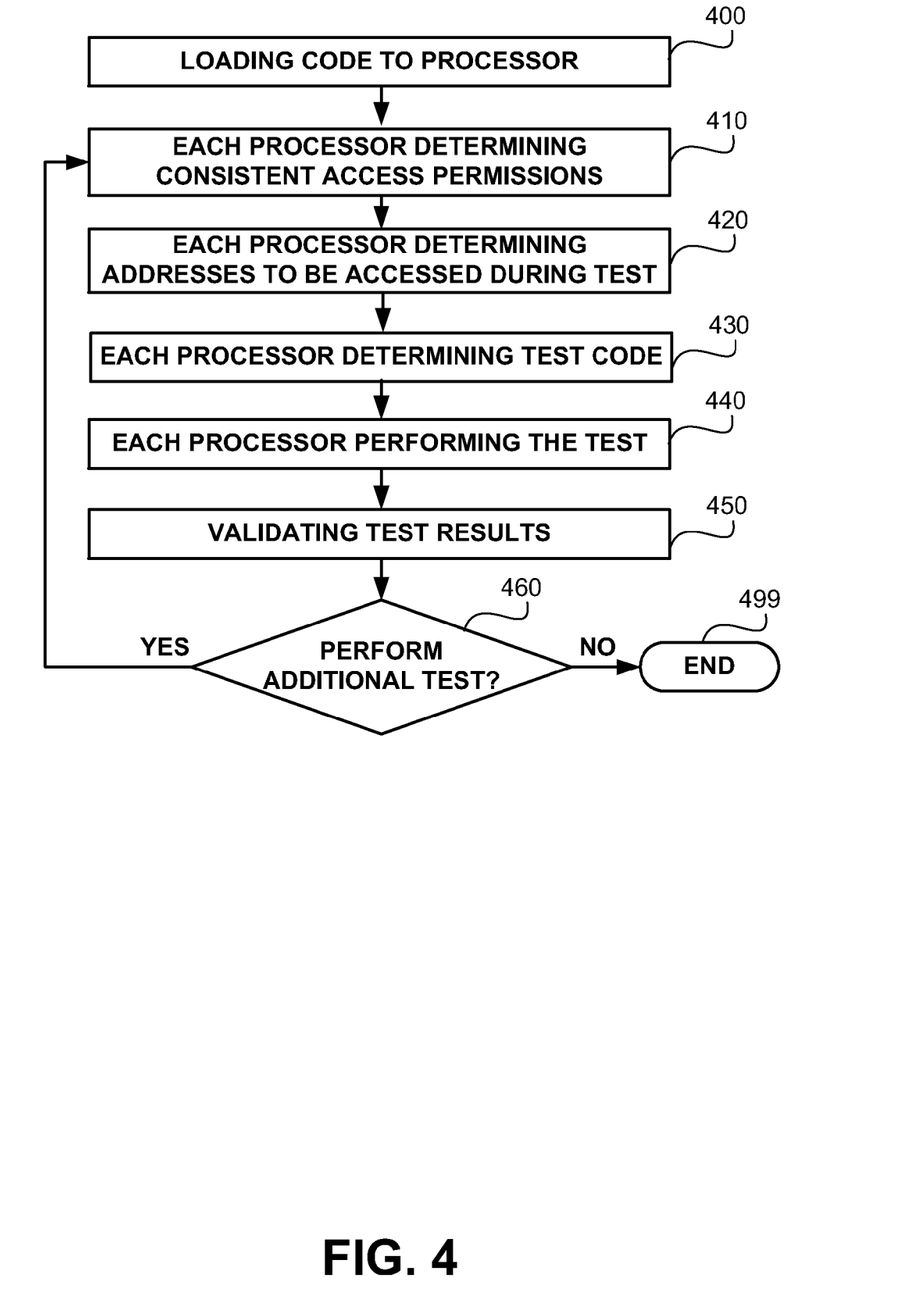
FIG. 4 shows a flowchart diagram of a method in accordance with some exemplary embodiments of the disclosed subject matter.

Referring now to FIG. 4 showing a flowchart diagram of a method in accordance with some exemplary embodiments of the disclosed subject matter.

In step 400, program code may be loaded to processor. The program code may be loaded by a loading module, such as 130 of FIG. 1. In some exemplary embodiments, the code may not need to be dynamically loaded, such as for example in case of firmware.

In step 410, each processor may determine a consistent access permissions schema. The consistent access permissions schema may be determined by an access permission determinator, such as 310 of FIG. 3. The consistent access permissions schema may be determined in a random manner, such as by utilizing a random module, such as 305 of FIG. 3. The consistent access permissions schema may be determined in a biased manner, such as by employing a biasing module, such as 140 of FIG. 1.

In step 420, each processor may determine addresses to be accessed during a test. A selected address may be stored in a GPR. The selection may be performed by an address selector, such as 330 of FIG. 3. The selection may be random. The selection may be biased. The selection may be performed in a manner that increases a probability of collisions, such as for example based on a traversal order of a memory device that is consistent to all processors. In some cases the traversal order may be consistent for a group of processors.

In step 430, each processor may determine a test code. The test code may be determined by an accessing module, such as 350 of FIG. 3. The test code may utilize the GPR storing the selected address to access the selected address. In some exemplary embodiments, the test code may differ from one processor to another. In other exemplary embodiments, the test code may be the same for all processors, each utilizing GPRs storing different values. The test code may be randomly determined, as is known in the art. The test code may be biased towards predetermined functionality, as is known in the art.

In step 440, each processor may perform the test. Performing the test may be done by a processor, such as 300 of FIG. 3. Performing the test may be performed by an accessing module 350.

In step 450, results of the test may be validated. In some cases, validation may not be possible or may be hard to perform and therefore may be omitted. The validation may be done based on a comparison of the results with expected results. The validation may be performed by a validation module, such as 360 of FIG. 3. Upon detection of an erroneous result, an output to a user may be issued. The output may be provided in a file, in a display or in another manner. The user may receive an indication of the output upon detection of the erroneous result, upon completion of the test or the like.

In step 460, a determination whether or not to perform an additional test may be determined. The additional test may utilize the same selected address of step 420 or select new addresses. In some exemplary embodiments, after a predetermined number of tests, such as sixteen, utilizing the same addresses, steps 410 and 420 may be performed to select new addresses. The additional test may utilize the same test code determined in step 430 or determine new test code. In some exemplary embodiments, after a predetermined number of tests, such as sixteen, utilizing the same test code, step 430 may be performed to determine new test code.

In case no additional test is to be performed, the method may end in step 499. In step 499 an indication of any errors discovered by the method may be provided to the user. The user may examine the test code and the results to manually assess whether an error occurred.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for testing a computerized device, the computerized device comprising a plurality of processors, the computerized device comprising a memory device having a plurality of memory addresses, each of the plurality of processors being configured to perform the steps of:
    randomly determining an access permission associated with a memory address of the plurality of memory addresses, wherein the access permission is determined based upon a first random determination;
    randomly selecting an address of the plurality of addresses based on the access permission, wherein the address is based upon a second random determination;
    generating a test for the processor using the randomly determined access permission and the randomly selected address;
    running the test by executing an access operation in the address selected in said selecting the address;
    wherein each of the plurality of processors are configured to separately make the same random determinations of access permissions; and
    wherein the results of the tests for each processor are used to determine a bug in a functionality of one or more of the plurality of processors.

2. The system of claim 1, comprising a random module configured to provide random determinations, wherein each processor is configured to utilize said random module at least to randomly determine the access permissions; and wherein said random module is configured to provide a same set of random decisions to each processor of the plurality of processors.

3. The computerized system of claim 2, wherein the random module comprises a joint random seed.

4. The computerized system of claim 2, wherein said each processor is configured to communicate with the random module; and wherein the random module comprises a synchronization module.

5. The computerized system of claim 1, wherein the access operation is selected from a group consisting of a read operation and a write operation.

6. The computerized system of claim 1 further comprising a validating module configured to indicate a bug in a functionality of a portion of said plurality of processors based on a content of the memory device.

7. The computerized system of claim 1 further comprising a loading module configured to load said access permission determinator, said address selector, and said accessing module in each of said plurality of processors.

8. The computerized system of claim 1 further comprising a biasing module comprising at least one of the following:
    a checkable operation bias module;
    a collision type bias module; and
    a memory topology aware bias module.

9. The system of claim 1, wherein each of the processors further being adapted to generate and execute the test, wherein the test comprises an instruction configured to perform the access operation.

10. The system of claim 1, wherein randomly determining the access permission is based on a template of access permissions.

11. The system of claim 10, wherein the template comprising of blocks, each of which associated with one or more memory addresses, wherein a block defining an access permission of the one or more memory addresses, wherein randomly determining the access permission based on the template of access permissions comprises determining a block associated with the memory address.

12. A method for testing a computerized device, the computerized device comprising a plurality of processors, the computerized device comprising a memory device having a plurality of memory addresses, the method comprising, at each of the plurality of processors:
    randomly determining an access permission associated with a memory address of the plurality of memory addresses, wherein the access permission is determined based upon a first random determination;
    randomly selecting an address of the plurality of addresses based on the access permission, wherein the address is based upon a second random determination;
    generating a test for the processor using the randomly determined access permission and the randomly selected address;
    running the test by executing an access operation in the address selected in said selecting the address;
    wherein each of the plurality of processors separately makes the same random determinations of access permissions; and
    wherein the results of the tests for each processor are used to determine a bug in a functionality of one or more of the plurality of processors.

13. The method of claim 12, wherein the first random determination is performed based on a joint random seed.

14. The method of claim 12, wherein said determining the access permission is based on a template of access permissions.

15. The method of claim 12, wherein said performing the access operation is performed several times.

16. The method of claim 12, wherein said selecting the address and said performing the access operation are performed iteratively.

17. The method of claim 12 further comprising in response to said performing the access, validating a result of the access operation, thereby testing the computerized device.

18. The method of claim 12, wherein the access permission is selected from a group consisting of:
    read permission;
    read and write permission; and
    read and exclusive write permission.

19. A computer program product comprising:
    a non-transitory computer readable medium;
    a set of program instructions operable in a computerized device comprising a plurality of processors, the computerized device having a plurality of memory addresses, wherein each processor of the plurality of processors executes an instance of said set of program instructions, each instance of said set of program instructions comprising:
a first program instruction for randomly determining an access permission associated with a memory address of the plurality of memory addresses, wherein the access permission is determined based upon a first random determination;
a second program instruction for randomly selecting an address of the plurality of addresses based on the access permission, wherein the address is based upon a second random determination;
a third program instruction for generating a test for a processor of the plurality of processors using the randomly determined access permission and the randomly selected address;
a fourth program instruction for running the test by executing an access operation in the address selected in said selecting the address;
wherein for each processor of the plurality of processors, an instance of the first program instruction separately makes the same random determination of the access permission;
wherein said first, second, third, and fourth program instructions are stored on said non-transitory computer readable medium; and
wherein the results of the tests for each processor are used to determine a bug in a functionality of one or more of the plurality of processors.

* * * * *